United States Patent [19]

Lewellen

[11] 4,456,151

[45] Jun. 26, 1984

[54] HOUSING FOR APPARATUS FOR MELTING AND DISPENSING THERMOPLASTIC MATERIAL

[75] Inventor: Richard R. Lewellen, Wooster, Ohio

[73] Assignee: Nordson Corporation, Amherst, Ohio

[21] Appl. No.: 301,518

[22] Filed: Sep. 14, 1981

[51] Int. Cl.³ .............................................. B67D 5/62
[52] U.S. Cl. ...................... 222/146 HE; 222/146 H; 222/173
[58] Field of Search ............... 222/146 HE, 130, 131, 222/146 H, 182, 183, 129, 173, 478, 481, 482, 483, 484

[56] References Cited

U.S. PATENT DOCUMENTS

| | | |
|---|---|---|
| 2,495,551 | 1/1950 | Sakowski ........................... 222/385 |
| 3,585,361 | 6/1971 | Rosen. | |
| 3,758,001 | 9/1973 | Callan ......................... 222/146 HE |
| 3,792,801 | 2/1974 | Baker et al. . | |
| 3,876,105 | 4/1975 | Kelling . | |
| 3,912,630 | 10/1975 | Reighard et al. . | |
| 4,059,714 | 11/1977 | Scholl et al. ................. 222/146 HE |
| 4,303,108 | 12/1981 | Akers et al. ................. 222/146 HE |
| 4,369,901 | 1/1983 | Hidding ............................ 222/483 |

Primary Examiner—Joseph J. Rolla
Assistant Examiner—Charles C. Compton
Attorney, Agent, or Firm—Wood, Herron & Evans

[57] ABSTRACT

An apparatus for melting and dispensing thermoplastic material including an open top melter tank, a dispenser for dispensing the molten material, and a pump for supplying the molten material from the tank to the dispenser. The tank and pump are contained within a housing which includes a cover over the tank. A tank lid is suspended from the cover by a snap-fit connection such that the housing including the attached cover may be removed from the tank and pump while the tank lid remains attached to the tank.

20 Claims, 7 Drawing Figures

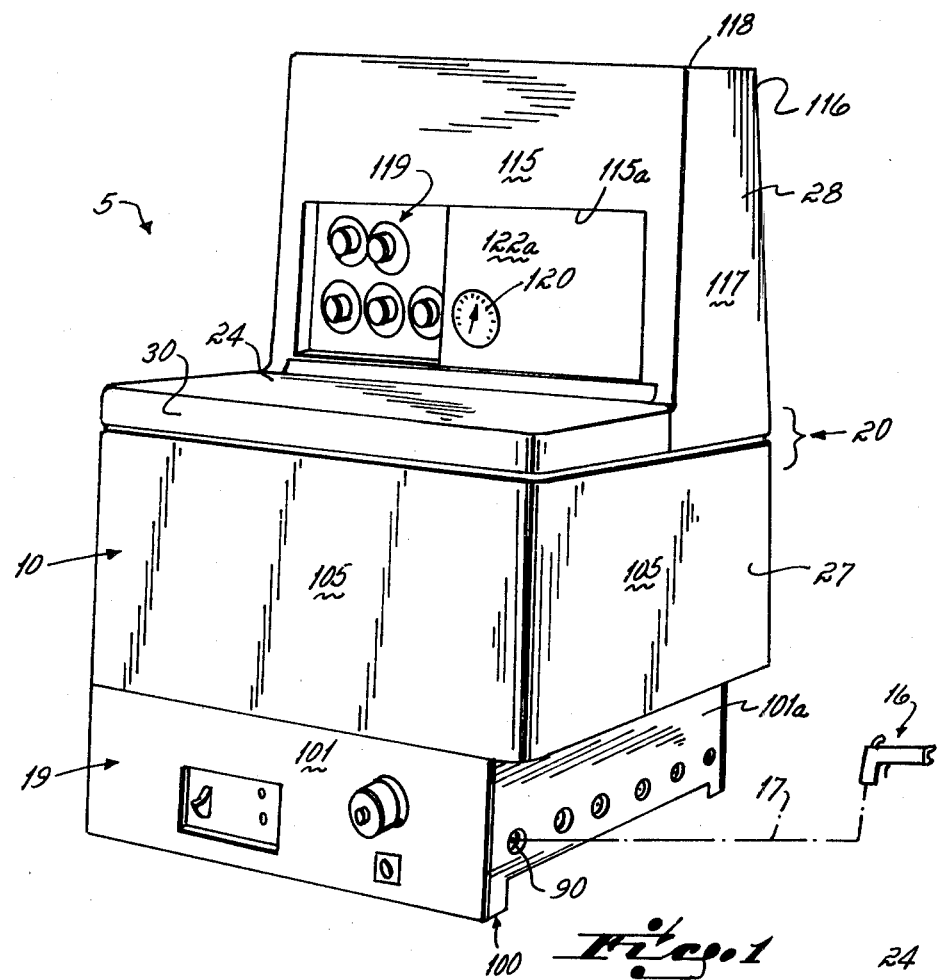
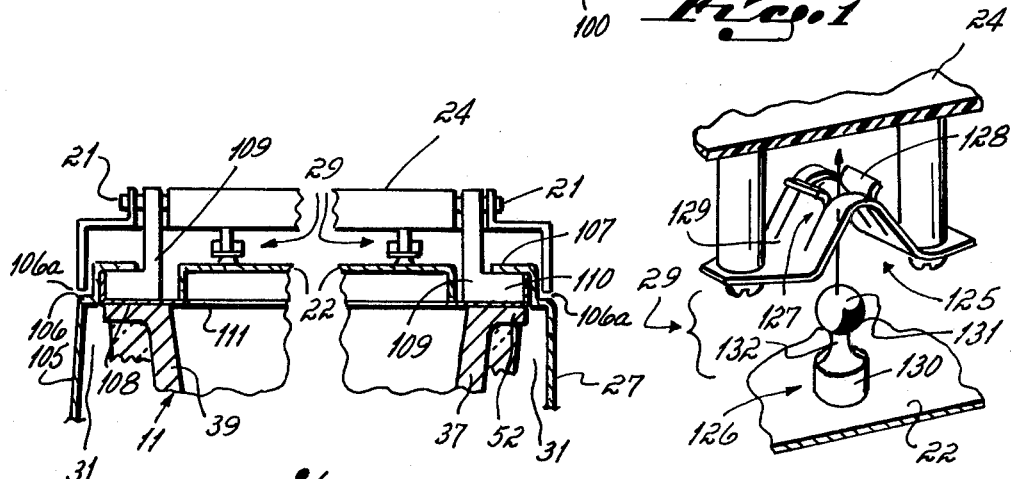

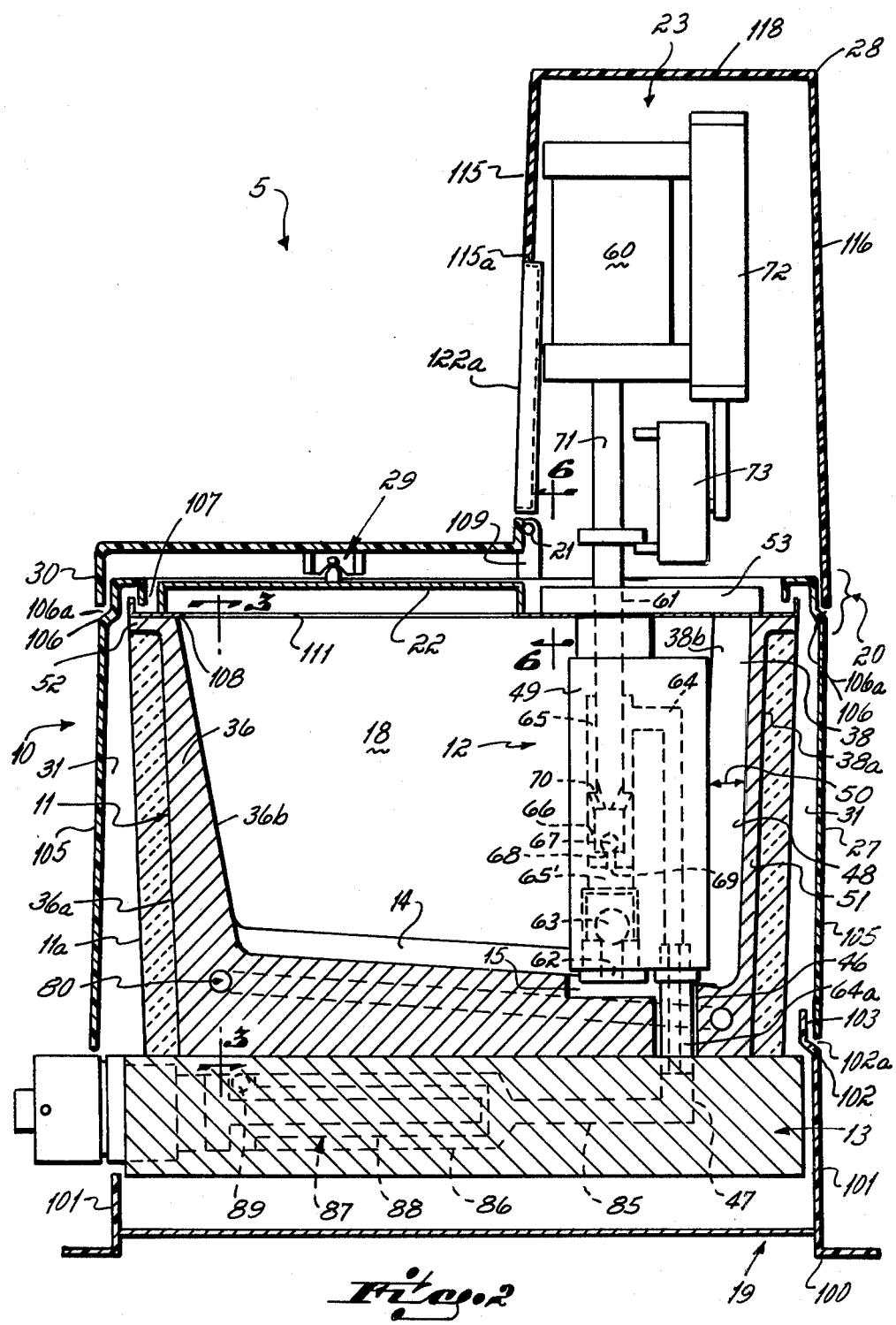

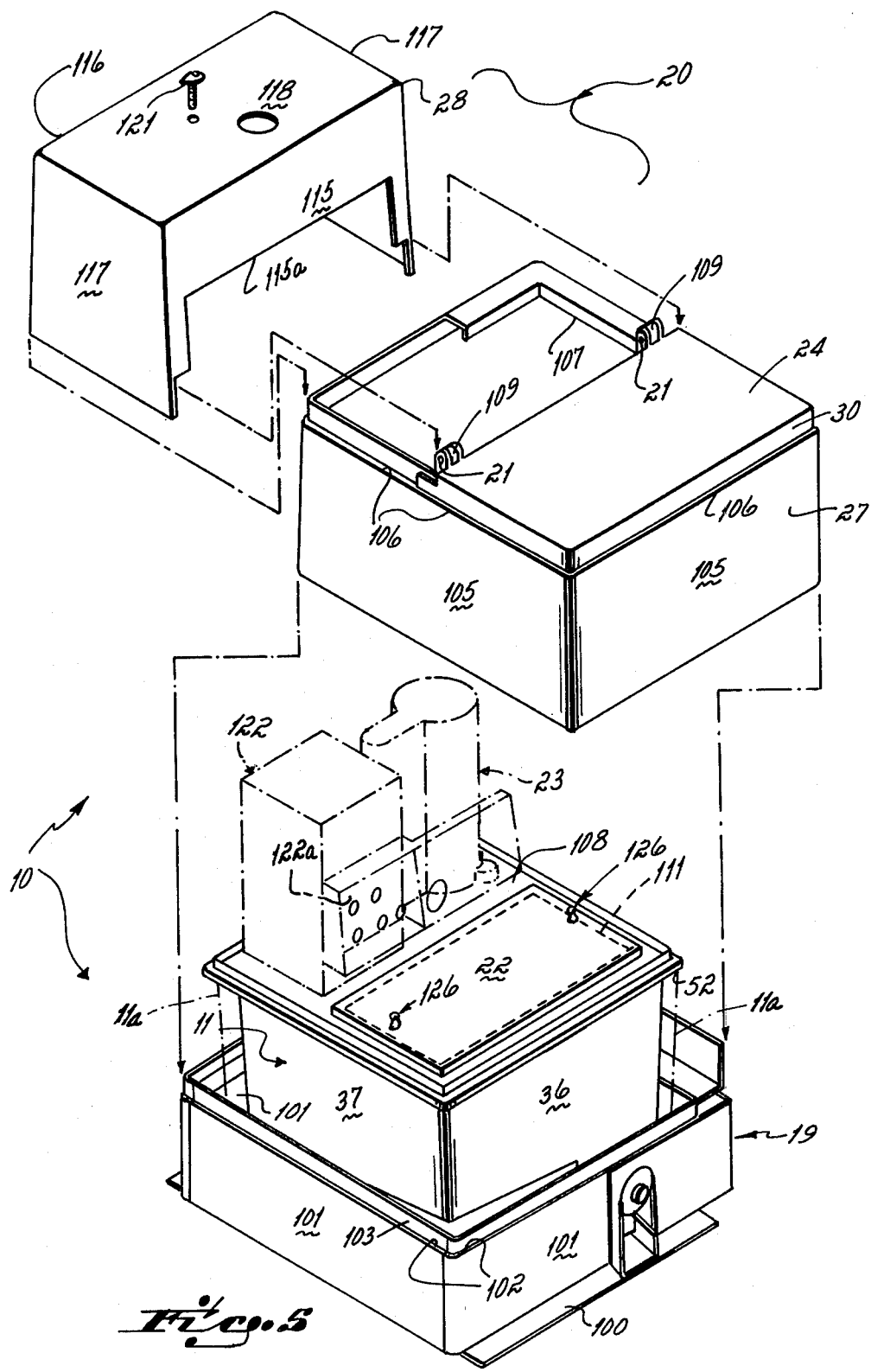

HOUSING FOR APPARATUS FOR MELTING AND DISPENSING THERMOPLASTIC MATERIAL

This invention relates to apparatus for melting and dispensing thermoplastic material and, more particularly, to an improved apparatus for melting thermoplastic material and maintaining it in the molten state.

Conventionally, thermoplastic materials, or so-called "hot melt" materials, are used as adhesives or sealants. These materials are all characterized by being solid at room temperature and molten at a temperature substantially above room temperature, usually a temperature on the order of 250° F. to 400° F. These materials are applied to target substrates, as for example to the flaps of packages, in the molten state and in the course of solidifying acquire their adhesive or solid state properties.

Thermoplastic materials are generally melted within closed containers because, in the course of melting, those materials evolve undesirable gases. Those gases, when subjected to atmospheric temperature, condense and recombine as beads or a film of thermoplastic adhesive. If the materials are melted in an uncovered container, the area surrounding the container will soon be covered with spots or a film of the adhesive material. Consequently, it is common practice to melt thermoplastic "hot melt" material in a closed container or tank having a removable lid or cover to contain the gases. The lid or cover is removable in order to enable a supply of solid thermoplastic material to be loaded into the tank or container.

One result of melting a hot melt adhesive within a closed container having a removable lid or cover is that the gases evolved from the "hot melt" material during the melting process condense and collect on the inside of the lid. When the apparatus is turned off and allowed to cool down, the adhesive collected on the inside of the lid or cover solidifies and adheres the lid to the walls of the tank. Generally this adhesion of the lid or cover of the melting tank or reservoir to the side walls of the reservoir presents no problem other than a possible delay in loading the reservoir with a new supply of solid thermoplastic material when the apparatus is restarted. This adhesion of the lid to the side walls is simply overcome by turning the apparatus back on and reheating the tank. As the tank reheats, the adhesive melts and releases the cover when the walls reach the melting temperature of the thermoplastic material. The lid can then be removed and a re-supply of hot melt inserted into the melter tank.

While the adhesion of the lid or cover to the side walls of the tank generally presents no problem to the use of the apparatus there are occasions when this adhesion presents a very serious problem. This serious problem occurs when the shut-down is occasioned by an electrical failure in the system, as for example, a failure in the electrical circuit which supplies electrical power to the resistance heaters used to heat the tank or a failure of the thermostat used to control that circuit. In that event, the tank cannot be reheated so as to release the lid from the tank until the electrical failure is corrected. Usually though, that failure cannot be corrected until the housing of the apparatus which encases the complete apparatus is removed so as to expose the electrical circuitry and that housing usually includes as a component or part of the housing, the lid or cover over the tank. Thus, the electrical circuitry cannot be exposed for repair until the lid portion of the housing is disconnected from the tank. In that event, the only choice is to physically force the lid from the tank to which it is adhered. Quite often that forceful removal involves destruction of the housing. Consequently, repair of a simple electrical component of the system may involve a time consuming and expensive operation to remove and possibly to replace the housing.

The alternative to forceful removal of the lid portion of the housing if the lid is adhered to the tank and the tank cannot be reheated because of an electrical failure, is to place the complete apparatus including the housing, melting tank, lid, etc. within an oven and to heat it to the melting temperature of the thermoplastic material. In the absence of an oven though, this alternative is not viable.

It has therefore been a primary objective of this invention to provide an improved apparatus for melting and dispensing thermoplastic adhesive which does not require the destruction of the housing of the apparatus in order to make an electrical repair whenever the cover of the melting tank is adhered to the tank.

This objective is accomplished and this invention is partially predicated upon the concept of separating the cover portion of the housing from the lid which covers the melter tank of the apparatus and by interconnecting the cover and the lid with a snap-fit connector. In the event that the lid becomes adhered to the tank and the apparatus cannot be reheated, either because of electrical failure or for any other reason, the cover can simply be lifted and broken away from the lid while the lid remains adhered to the tank. Thus, the complete housing including the cover may now be removed from the apparatus so as to expose electrical or other components of the system which need to be repaired while the tank lid remains adhered to the tank.

The advantage of this construction is that it enables the apparatus to be repaired by removal of the housing at any time, including times when the apparatus is cold and the tank lid is adhered to the tank side walls. Thereby, there is never any need to destroy the housing over the apparatus in order to gain access to a component of the apparatus located beneath the housing, even if the cover over the tank is adhered to the top of the tank.

Another problem commonly encountered with prior art thermoplastic material hot melt dispensing apparatus occurs when solid thermoplastic material is loaded into the melter tank. During loading of the tank the cover of the housing is open and molten thermoplastic material often splashes onto the console portion of the housing where the dials and gauges of the apparatus are located. It has therefore been another objective of this invention to overcome this problem by so locating the gauges and dials and control console portion of the housing relative to the cover of the tank that molten thermoplastic material can never be splashed onto the controls or console portion of the housing.

This invention accomplishes this objective by placing the console portion of the housing above and behind the tank and by connecting the cover to the housing by a hinge located along the bottom front edge of the console section. The cover is so sized that when it is opened, it rotates approximately 90° until it rests against the front face of the console and covers that front face so as to protect it from splash when solid material is poured into the tank. With this invention that splash is all now caught by the inside surface of the cover before it can contact the front face of the console with its exposed dials and gauges.

Still another problem encountered in the past with thermoplastic material melting apparatus has been attributable to the excessive temperature reached by the housing of the apparatus. In the past it has been common to attach heat insulative material to the inside surface of the housing so as to prevent heat from the thermoplastic material melting tank from overheating the housing. In spite of that insulation though, quite commonly the housing becomes so hot that it cannot be safely touched.

It has therefore been another objective of this invention to provide an improved thermoplastic melting and dispensing apparatus which is so constructed that the exterior housing of the apparatus remains cool to the touch.

This objective is accomplished by strapping heat insulating material to the exterior of the tank and then providing an air flow space between the tank insulation and the inside surface of the housing side walls. The housing is so constructed with air flow gaps at the top and bottom of the side walls that air flows by convection through the space between the tank insulation and the housing side walls.

These and other objects and advantages of this invention will be more readily apparent from the following description of the drawings in which:

FIG. 1 is a perspective view of a thermoplastic material melting and dispensing apparatus incorporating the invention of this application.

FIG. 2 is a cross sectional view through the apparatus of FIG. 1.

FIG. 5 is a diagrammatic exploded perspective view of the apparatus of FIG. 1.

FIG. 6 is a cross sectional view taken along line 6—6 of FIG. 2.

FIG. 7 is a perspective view of a snap-fit connector employed in this invention for connecting the tank lid to the housing cover.

Figure 3:
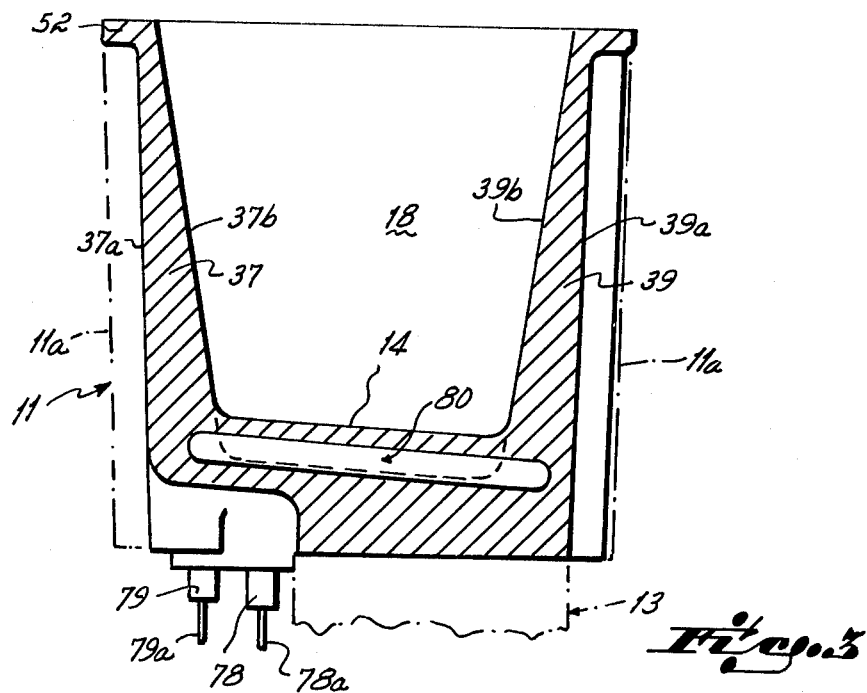
FIG. 3 is a cross sectional view through the melter tank taken on line 3—3 of FIG. 2.

Referring first to FIGS. 1 and 2 it will be seen that the thermoplastic material melting and dispensing apparatus 5 of this invention comprises a housing 10 within which there is located a tank melter 11, a pump 12, and a manifold block 13. Solid thermoplastic material in the form of chunks, pellets, or blocks are placed in the melter tank 11 where they are melted and from which they flow via a sloping bottom wall 14 toward a recess or pump inlet 15 for the pump 12. The pump then causes the molten material to be supplied under pressure into the manifold block 13 from whence it is directed to one or more conventional applicators or dispensers 16 via hoses or conduits indicated diagrammatically at 17.

Housing

The housing 10 comprises the base 19 and a fiberglass reinforced plastic shroud 20 mounted atop that base 19. The shroud 20 comprises a base section 27 and a console section 28 mounted atop the base section 27. The base 19 and base section 27 of the shroud encloses or encases the melter tank 11, manifold 13, and a portion of the electrical control system for controlling the temperature of the components throughout the system. The console section 28 of the shroud encloses the drive section 23 of the pump 12 and a control cabinet 122 within which there are selected electrical control components of the control circuit for measuring and controlling the temperature of the heated components throughout the system.

The base comprises a frame assembly 100 to which there is secured three vertical fiberglass reinforced plastic side walls 101 and a sheet metal guard 101A. These side walls terminate along their upper edge in an inwardly offset lip 102 and a vertical flange 103. The base section 27 of the shroud fits over these vertical flanges 103 and is supported from the horizontal lips 102.

The base section 27 of the shroud comprises four vertical fiberglass reinforced plastic walls 105, the upper edge of which terminates in an inwardly offset lip 106. The end 107 of this lip is bent downwardly and received inside a vertical flange of a pan shaped sheet metal tank top 108 attached to the top of the tank 11. A cover 24 is connected to the base section 27 of the shroud by hinge pins 21.

With reference to FIG. 6 it will be seen that the hinge pins 21 are mounted within a pair of L-shaped brackets 109. The horizontal leg 110 of each of these brackets 109 is fixed to the horizontal flange 107 of the base section shroud 27 by conventional connectors (not shown). Thus, the housing cover 24 is free to pivot and open about hinges 21.

The sheet metal pan 108 which is attached to the top of the tank 11 has a rectangular opening 111 therein through which solid thermoplastic material may be loaded into the tank 11. This opening 111 is covered by a tank lid 22. The lid 22 is connected to the inside of the housing cover 24 by snap-fit connectors 29 such that the tank lid normally is opened and closed with the housing cover 24 as that cover is pivoted about the hinges 21. In other words, when the housing cover 24 is opened by lifting the front edge 30 upwardly about the hinge pin 21, the lid 22 is correspondingly moved with the cover so as to expose the interior 18 of the tank 11. Thereby, the inside of the tank may be filled with solid thermoplastic material.

The console section 28 of the shroud comprises a front wall 115, a rear wall 116, a pair of side walls 117 and a top wall 118. As shown in FIG. 1, the front wall 115 has an opening 115a which permits access to the control panel 122a attached to the front of the electrical control cabinet 122. Mounted on the control panel 122a are the dials 119 for setting the temperature of the components of the system and a gauge 120 for reading the temperature of the melter tank bottom wall. The console section 28 of the housing is attached to the tank via a threaded connector 121 which threads into the electrical control cabinet 122 mounted on the pan shaped tank top 108. This cabinet 122 is attached via conventional connectors (not shown).

There is an air flow space 31 located between the inside surface of each of the four side walls 105 of the base section 27 of the shroud and the exterior surface 11b of a layer of insulative material 11a attached to the exterior side walls 36a of the melter tank 11. Additionally, there are air flow gaps 102a between the bottom edges of the side walls 105 of the base section of the housing shroud and the top edges of the side walls 101 and 101a of the base 19. There are also air flow gaps 106a between the top edges of the side walls 105 of the base section of the housing and the bottom edge of the console section of the housing as well as between the top edge of the side walls 105 and the bottom edge of the housing cover 24. Consequently, air is free to flow by convection through the air flow gaps 102a around the bottom of the side walls 105, upwardly through the air flow spaces 31 between the side walls 105 and the insulation material 11a attached to the exterior of the tank 11, and out through the air flow gaps 106a around the top edges of the side walls 105. The effect of this air flow is to maintain all of the walls of the housing sufficiently cool as to feel cool to the touch.

As best seen in FIG. 7, the snap-fit connectors 29 which connect the tank lid 22 to the housing cover 24 preferably are a pair of "Tinnerman" ball stud fasteners. Each of these fasteners 29 comprises a spring clip 125 attached to the inside of the cover 24 and a ball stud 126 secured to the top surface of the tank lid 22.

The spring clips 125 are each formed from a sheet of heat treated spring steel having a flat base section from which there extends a V-shaped section. The center of the V-shaped section is cut transversely across the top of the V so as to form two spring biased ears 127, the outer ends 128 of which are bent outwardly and the inner ends 129 of which are attached to the base section of the clips. The base section of the clips are fixedly connected to the inside of the cover 24 by rivets or other conventional connectors (not shown).

The ball studs 126 each comprise a cylindrical base section 130 interconnected to a spherical ball section 131 by a narrow neck 132. The bottom of the cylindrical section is fixedly secured to the top of the tank lid 22 by a conventional connector (not shown).

When the connector 29 is connected, the ball section 131 of the ball stud 126 is inserted between the ends 128 of the ears 127 of spring clip 125, the ends of the ears fit into the neck section 132 of the ball stud 126 so as to interconnect the ball stud to the spring clips in a releasable snap-fit type connection. Since the balls are attached to the tank lid 22 and the spring clips are attached to the housing cover 24, the connectors 29 interconnect the tank lid 22 and the housing cover 24 with a releasable connection so that in use the tank lid moves with the cover and remains suspended from the cover when the cover is opened. If however, the tank lid is for any reason secured to the top 108 of the tank 111, the snap-fit connectors 29 will release and permit the housing cover 24 to be opened while the tank lid 22 remains attached atop the tank.

It is to be noted that the depth of the tank cover (from front to rear) is approximately the same as the height of the front wall 115 of the console 28 and that the width of the cover is the same as the width of the front wall of the console. Consequently, when the cover is open, it rests against the front wall of the console and covers that front wall so as to protect it from splash which may be generated when solid thermoplastic material is poured into the melter tank 11 containing molten thermoplastic material.

Melter Tank

The melter tank 11 comprises a metal casting having the bottom wall 14 and four side walls 36, 37, 38 and 39. The tank is open at the top so that solid thermoplastic material may be placed within the top when cover 24 and the attached tank lid 22 are open.

The side walls 36, 37, 38 and 39 of the tank are all generally triangular in cross sectional configuration as may be seen most clearly in FIGS. 2 and 3. The outer surface 36a, 37a, 38a and 39a of each wall is located in a nearly vertical plane. The inside surface 36b, 37b, 38b and 39b of each wall slopes downwardly and inwardly with the result that the top edge of each wall is thinner than the bottom edge. This taper of the walls functions to facilitate heat transfer from the base of each wall upwardly. Thus, each side wall acts as a fin to efficiently conduct heat upwardly from the heated bottom wall 14 of the tank into thermoplastic material contained within the tank.

The bottom wall 14 of the tank slopes downwardly from the side walls to one corner where the pump inlet or recess 15 receives the bottom of the pump 12. This recess is open to a vertical port 46 which extends through the bottom of the tank and is open to a conduit 47 contained within the manifold block 13. As a consequence of the sloping bottom wall of the tank, all molten material within the tank flows downwardly over the tank walls and ultimately into the recess 15.

Figure 4:
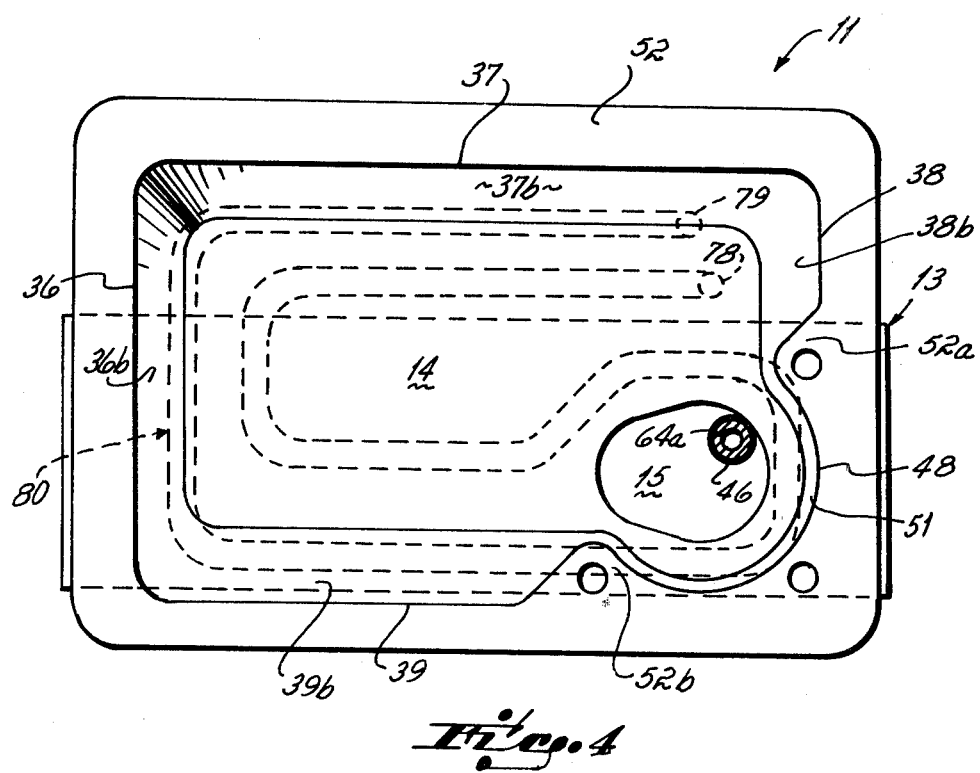
FIG. 4 is a top plan view of the melter tank employed in the apparatus.

With reference to FIGS. 2 and 4 it will be seen that one corner of the melter tank 11 has a vertical recess 48 formed therein which is arcuate in configuration and which is adapted to receive the cylinder of the pump 12. A clearance gap 50 between the vertical side wall of the pump cylinder and the arcuate vertical wall 51 of the recess 48 is in open communication with the interior of the tank so that any molten material contained therein flows downwardly and ultimately into the recess 15 in the bottom of the tank.

Extending outwardly from the top edge of each side wall 36, 37, 38, 39 there is a flange 52. As may be seen most clearly in FIG. 4, this flange extends completely about the top edge of the tank. At the corner within which the pump 12 is mounted, the flange 52 has protrusions 52a and 52b extending downwardly along the tank side walls so as to facilitate attachment of a mounting plate 53 of the pump.

An electrical heating element in the form of a constant diameter, fixed resistance, heating element 80 is cast into the bottom wall 14 of the tank. This heating element is asymmetrically configured within the bottom wall so as to impart heat to selected areas of the bottom wall in proportion to the heat required to melt and then maintain thermoplastic material in those selected areas at a preselected optimal temperature. The ends 78, 79 of the electrical heating element 80 extend from the bottom of the tank and terminate in electrical connectors 78a, 79a. These connectors are connected to conventional electrical circuitry (not shown) operative to supply electrical power to the heating element 80.

Pump

The pump 12 illustrated herein is a conventional single acting reciprocating piston pump. A complete description of this pump 12 and the air motor 60 for actuating it may be found in U.S. Pat. No. 3,585,361 for "Supply System for Thermoplastic Materials", which patent issued on June 15, 1971 and is assigned to the assignee of this application. Briefly, it comprises the cylinder 49 having a chamber 65 therein within which a piston 66 is reciprocable. At the lower end of the cylinder 49 there is an inlet 62 which opens into the recess 15 of the melter tank 11. This pump inlet 62 is closed at its upper end by a ball check 63. An outlet passge 64 at the upper end of the cylinder chamber 65 is in fluid communication with the chamber 65 and the passage 47 of the manifold block 13.

In the operation of the pump, when the piston 66 which is attached to the lower end of a piston rod 61 is raised, the volume of chamber 65 above the piston is filled with liquid thermoplastic material. That volume of thermoplastic material is then forced as the piston 66 rises to flow out through the passage 64 at the upper end of the chamber 65. During this upward movement a ball check 67 contained within the piston is held tightly against its seat 68 so that there is no liquid flow from the chamber 65 above the piston through the piston 65 to the lower portion 65' of the chamber located beneath the piston 66. During this upward movement of the piston 66 the lower ball check 63 is lifted upwardly off of its seat in response to the pressure of incoming material seeking to fill the void left by piston 66. When piston 66 has completed its upward stroke, lower chamber 65' is filled with liquid material which has been drawn in on the upward stroke. On the downward stroke of piston 66, ball check 63 seats and remains firmly seated while ball check 67 is moved upwardly on its seat permitting displaced material to move upwardly through piston inlet 69 past ball check 67 and through ports 70 to displace material in the chamber 65 forced outwardly through the outlet conduits 64.

The air motor 60 of the pump comprises a cylinder housing within which a pneumatic piston reciprocates to drive a connecting rod 71 attached to the upper end of the piston rod 61. Air is supplied to the opposite sides of the piston motor under the control of a conventional four-way valve 72. A complete description of the piston motor 60 and four-way valve 72 as well as an over-center mechanism 73 for controlling positioning of the valve 72 may be found in the above identified U.S. Pat. No. 3,585,361. Since the operation of the pneumatic piston motor 60, valve 72 and the over-center mechanism 73 is conventional, it has not been illustrated and described in detail herein.

Manifold Block

The manifold block 13 is only partially illustrated in FIG. 2 since per se it forms no part of the claimed invention of this application. Molten material from the pump 12 enters the inlet port 47 of the manifold block from a nozzle extension 64a of the pump. The inlet port 47 is connected to a horizontal passageway 85 of the manifold block which communicates with a filter chamber 86 of the block. Within this chamber there is a conventional thermoplastic material filter 104. One such filter which is suitable for use in a manifold block 13 is the subject of U.S. Pat. No. 3,912,630 of Reighard, et al. which issued on Oct. 14, 1975 and is assigned to the assignee of this application. The filter contains a filtering screen, indicated diagrammatically at 88, which is operative to entrap any solids and prevent them from passing through the filter to a transverse manifold block passageway 89. The passageway 89 is in turn connected to multiple outlet ports 90 (FIG. 1) of the manifold block through other passageways (not shown) contained in the manifold block. Hoses or other conduits 17 connect those outlet ports 90 with conventional hot melt dispensers or guns 16.

Operation

In the operation of the melting and dispensing apparatus 5 of this invention, an operating cycle is initiated by lifting of the hinged cover 24 upwardly together with the attached lid 22 so as to expose the open top of the tank 11. Solid thermoplastic material or so-called hot melt material in the form of chunks, pellets or blocks are then dumped into the tank 11 and the cover 24 closed. Electrical power to the heating element 80 is then turned on via a conventional electrical switch on the front of the housing. The heating element 80 then functions to heat the bottom and side walls of the melter tank 11 to a temperature controlled by a thermostat (not shown) at which temperature the solid thermoplastic material contained within the tank melts and converts to the molten state. That molten material then flows downwardly into the recess 15 at the bottom of the tank from which it is pumped by the piston pump 12 through the pump outlet passage 64 into the inlet port 47 of the manifold block 13. From that inlet port the molten material flows under pressure through the filter chamber 86, the filter 87 to the outlet ports 90 from which the molten material is flowed via hoses or conduits 17 to conventional dispensers 16.

Quite commonly, after the apparatus 5 has been in use and allowed to cool down, as for example between shifts of a work crew or overnight, the tank lid 22 is found to be adhered to the top of the sheet metal pan 108 which is in turn adhered to the top of the melter tank 11. This adhesion of the lid 22 to its supporting surface occurs because the gases evolved from the molten "hot melt" adhesive in the tank condense on the lid and recombine to form molten adhesive which, when it cools, forms a solid adhesive securing the tank lid 22 to whatever surface is supporting it, in this case the sheet metal pan atop the melter tank 11. In that event, in order to reload the tank 11 with solid thermoplastic material, the tank must be first heated so as to remelt the adhesive securing the lid 22 to the pan 108. This remelting presents no problem unless the tank cannot be reheated, as for example because of a failure of the electrical control circuit to the heater element 80. In that event the housing 10 must be removed from over the tank so as to enable the electrical components contained interiorly of the housing 10 to be exposed for repair. Prior to this invention, the housing cover 24 and the tank lid 22 were a single integral unit or assembly and as a consequence, if the lid were adhered to the tank, the housing could not be removed until the tank was reheated. If the reason the tank cooled though was because of a failure in the control circuit of the tank heating element, then the tank could not be reheated. The result was that the housing often had to be broken in order to disconnect the housing cover from the tank so as to enable the housing to be removed from over the electrical components of the apparatus.

The invention of this application eliminates this problem by forming the tank lid 22 and housing cover as two separate disconnectable items such that the housing 10 with its attached cover 24 may be removed while the tank lid 22 remains attached to the tank. The snap-fit connectors 29 facilitate this disconnection. The result is an apparatus in which electrical failure may be repaired much more expeditiously and while the apparatus remains cool or cold without the need for preheating.

While I have described only a single preferred embodiment of my invention, persons skilled in the art to which it pertains will appreciate changes and modifications which may be made without departing from the spirit of my invention. Therefore, I do not intend to be limited except by the scope of the following appended claims.

I claim:

1. An apparatus for melting solid thermoplastic material and for supplying the molten thermoplastic material to a dispenser, said apparatus including a melter tank, said tank comprising a bottom wall and side walls extending upwardly from said bottom wall, said tank having an open top, electrical resistance heating means mounted within said bottom wall of said tank, electrical control means for supplying electrical power to said heating means so as to maintain thermoplastic material contained in said tank at a preset temperature, a housing encasing said tank and said electrical control means, said housing including a cover over said open top of said melter tank, a tank lid over the open top of said tank, and a connector between said tank lid and said housing cover, said connector being a snap-fit connector and including a spring element for retaining said tank lid attached to said housing cover, said spring element being operable to release said tank lid from said housing cover in the event that said tank lid becomes adhered to said tank.

2. An apparatus for melting solid thermoplastic material and for supplying the molten thermoplastic material to a dispenser, said apparatus including a melter tank, said tank comprising a bottom wall and side walls extending upwardly from said bottom wall, said tank having an open top, electrical resistance heating means mounted within said bottom wall of said tank, electrical control means for supplying electrical power to said heating means so as to maintain thermoplastic material contained in said tank at a preset temperature, a housing encasing said tank and said electrical control means, said housing including a cover over said open top of said melter tank, a tank lid over the open top of said tank, a connector between said tank lid and said housing cover, said housing including a base section surrounding said melter tank and a console section, said console section being located above and to the rear of said base section, said console section having a front wall, and said housing cover being hingedly connected to the housing along the lower edge of said console front wall, said housing cover being approximately the same dimension from front to rear as the height of said front wall of said console and the housing cover being at least as wide as the width of said console so that said housing cover, when open, covers the front wall of said console and protects it against splash of molten thermoplastic material during loading of solid thermoplastic material into said tank.

3. An apparatus for melting solid thermoplastic material and for supplying the molten thermoplastic material to a dispenser, said apparatus including a reservoir, said reservoir comprising a bottom wall and side walls extending upwardly from said bottom wall, said reservoir having an open top, electrical resistance heating means mounted within said bottom wall of said reservoir, electrical control means for supplying electrical power to said heating means so as to maintain thermoplastic material contained in said reservoir at a preset temperature, a housing encasing said reservoir and said electrical control means, said housing including a cover over said open top of said reservoir, a reservoir lid over the open top of said reservoir, a connector between said reservoir lid and said housing cover, and said connector being a snap-fit connector and including a spring element for retaining said reservoir lid attached to said housing cover, said spring element being operable to release said reservoir lid from said housing cover in the event that said reservoir lid becomes adhered to said reservoir.

4. An apparatus for melting solid thermoplastic material and for supplying the molten thermoplastic material to a dispenser, said apparatus including a reservoir, said reservoir comprising a bottom wall and side walls extending upwardly from said bottom wall, said reservoir having an open top, electrical resistance heating means mounted within said bottom wall of said reservoir, electrical control means for supplying electrical power to said housing means so as to maintain thermoplastic material contained in said reservoir at a preset temperature, a housing encasing said reservoir and said electrical control means, said housing including a cover over said open top of said reservoir, a reservoir lid over the open top of said reservoir, and a connector between said reservoir lid and said housing cover, said housing including a base section surrounding said reservoir and a console section, said console section being located above and to the rear of said base section, said console section having a front wall, and said housing cover being hingedly connected to the housing along the lower edge of said console front wall, said housing cover being approximately the same dimension from front to rear as the height of said front wall of said console and the housing cover being at least as wide as the width of said console so that said housing cover, when open, covers the front wall of said console and protects it against splash of molten thermoplastic material during loading of solid thermoplastic material into said tank.

5. An apparatus for melting solid thermoplastic material and for supplying the molten thermoplastic material to a dispenser, said apparatus including a melter tank, said tank comprising a bottom wall and side walls extending upwardly from said bottom wall, said tank having an open top, electrical resistance heating means mounted within said bottom wall of said tank, electrical control means for supplying electrical power to said heating means so as to maintain thermoplastic material contained in said tank at a preset temperature, a housing encasing said tank and said electrical control means, said housing including a cover over said open top of said melter tank, a tank lid under the housing cover and over the open top of said tank, and a connector between said tank lid and said housing cover.

6. The apparatus of claim 1 in which said connector is a snap-fit connector.

7. The apparatus of claim 1 in which said connector is so constructed as to enable said housing cover to be disconnected from said tank lid while said tank lid is attached to said melter tank.

8. The apparatus of claim 1 in which said housing cover is hingedly connected along one edge to said housing.

9. The apparatus of claim 1 in which said housing includes a base section surrounding said melter tank and a console section, said console section being located above and to the rear of said base section, said console section having a front wall, and said housing cover being hingedly connected to the housing along the lower edge of said console front wall.

10. The apparatus of claim 9 which further includes a pump located within said melter tank, said pump being operative to supply molten material under pressure from said melter tank to said dispenser, and motor means for operating said pump, said motor means being located within said console section of said housing.

11. An apparatus for melting solid thermoplastic material and for supplying the molten thermoplastic material to a dispenser, said apparatus including a reservoir, said reservoir comprising a bottom wall and side walls extending upwardly from said bottom wall, said reservoir having an open top, electrical resistance heating means mounted within said bottom wall of said reservoir, electrical control means for supplying electrical power to said heating means so as to maintain thermoplastic material contained in said reservoir at a preset temperature, a housing encasing said reservoir and said electrical control means, said housing including a cover over said open top of said reservoir, a reservoir lid under said housing cover and over the open top of said reservoir, and a connector between said reservoir lid and said housing cover.

12. The apparatus of claim 11 in which said connector is a snap-fit connector.

13. The apparatus of claim 11 in which said connector is so constructed as to enable said housing cover to be disconnected from said reservoir lid while said reservoir lid is attached to said reservoir.

14. The apparatus of claim 11 in which said housing cover is hingedly connected along one edge to said housing.

15. The apparatus of claim 11 in which said housing includes a base section surrounding said reservoir and a console section, said console section being located above and to the rear of said base section, said console section having a front wall, and said housing cover being hingedly connected to the housing along the lower edge of said console front wall.

16. The apparatus of claim 15 which further includes a pump located within said reservoir, said pump being operative to supply molten material under pressure from said reservoir to said dispenser, and motor means for operating said pump, said motor means being located within said console section of said housing.

17. An apparatus for melting solid thermoplastic material and for supplying the molten thermoplastic material to a dispenser, said apparatus including a melter tank, said tank comprising a bottom wall and side walls extending upwardly from said bottom wall, said tank having an open top, electrical resistance heating means mounted within said bottom wall of said tank, electrical control means for supplying electrical power to said heating means so as to maintain thermoplastic material contained in said tank at a preset temperature, a housing encasing said tank and said electrical control means, said housing including a cover over said open top of said melter tank, said housing including a base section surrounding said melter tank and a console section, said console section being located above and to the rear of said base section, said console section having a front wall, and said housing cover being hingedly connected to the housing at the lower edge of said console front wall.

18. The apparatus of claim 17 in which said housing cover is hingedly connected to said housing base section at the lower edge of said console front wall.

19. The apparatus of claim 17 in which said housing cover is approximately the same dimension from front to rear as the height of said front wall of said console and the housing cover is at least as wide as the width of said console so that said housing cover, when open, covers the front wall of said console and protects it against splash of molten thermoplastic material during loading of said solid thermoplastic material into said tank.

20. The apparatus of claim 19 which further includes a pump located within said melter tank, said pump being operative to supply molten material under pressure from said melter tank to said dispenser, and motor means for operating said pump, said motor means being located within said console section of said housing.

* * * * *

UNITED STATES PATENT AND TRADEMARK OFFICE
CERTIFICATE OF CORRECTION

PATENT NO.  : 4,456,151
DATED       : June 26, 1984
INVENTOR(S) : Richard R. Lewellen It is certified that error appears in the above-identified patent and that said Letters Patent is hereby corrected as shown below:

Column 6, line 62 "passge" should be -- passage --

Claim 4, Column 10, line 22, "housing" should be -- heating --

Signed and Sealed this

Twelfth Day of March 1985

[SEAL]

Attest:

DONALD J. QUIGG

Attesting Officer          Acting Commissioner of Patents and Trademarks